(12) United States Patent
Leeb (10) Patent No.: US 12,105,511 B2
(45) Date of Patent: Oct. 1, 2024

(54) AUTONOMOUS AGRICULTURAL WORKING MACHINE AND METHOD OF OPERATION

(71) Applicant: HORSCH LEEB Application Systems GmbH, Oberpöring (DE)

(72) Inventor: Theodor Leeb, Landau an der Isar (DE)

(73) Assignee: HORSCH LEEB Application Systems GmbH, Oberporing (DE)

( * ) Notice: Subject to any disclaimer, the term of this patent is extended or adjusted under 35 U.S.C. 154(b) by 13 days.

(21) Appl. No.: 16/863,578

(22) Filed: Apr. 30, 2020

(65) Prior Publication Data

US 2020/0356096 A1 Nov. 12, 2020

(30) Foreign Application Priority Data

May 2, 2019 (DE) .......................... 102019111315.6

(51) Int. Cl.
*G05D 1/00* (2024.01)
*A01B 69/04* (2006.01)
*G01C 21/34* (2006.01)
*G01C 21/36* (2006.01)

(52) U.S. Cl.
CPC ......... *G05D 1/0212* (2013.01); *A01B 69/008* (2013.01); *G01C 21/3407* (2013.01); *G01C 21/36* (2013.01); *G05D 1/0231* (2013.01); *G05D 1/0257* (2013.01); *G05D 1/0276* (2013.01)

(58) Field of Classification Search
CPC .. G05D 1/0212; G05D 1/0257; G05D 1/0231; G05D 1/0276; G05D 2201/0201; G05D 1/0234; G05D 1/0278; G01C 21/36; G01C 21/3407; G01C 21/20; A01B 69/008; A01B 79/005
See application file for complete search history.

(56) References Cited

U.S. PATENT DOCUMENTS

| | | | |
|---|---|---|---|
| 5,563,786 A | 10/1996 | Torii | |
| 5,974,348 A | 10/1999 | Rocks | |
| 6,760,654 B2 | 7/2004 | Beck | |
| 8,392,065 B2 | 3/2013 | Tolstedt et al. | |
| 2002/0193928 A1* | 12/2002 | Beck ................... | A01B 79/005 701/50 |

(Continued)

FOREIGN PATENT DOCUMENTS

| | | |
|---|---|---|
| DE | 19504475 A1 | 8/1995 |
| DE | 102018108024 A1 | 10/2019 |

(Continued)

*Primary Examiner* — Abdalla A Khaled
(74) *Attorney, Agent, or Firm* — AVEK IP, LLC; Kent R. Erickson (57) ABSTRACT

The invention relates, inter alia, to a method for operating an autonomous agricultural work machine. A first current position of the agricultural work machine is determined by means of a first position-determining device. A second current position of the agricultural work machine is determined by means of a second position-determining device. A difference value which relates to a difference between the first current position and the second current position is determined. The work machine is operated autonomously as a function of the determined difference value.

21 Claims, 5 Drawing Sheets

(56) References Cited

U.S. PATENT DOCUMENTS

| | | | |
|---|---|---|---|
| 2006/0220954 A1* | 10/2006 | Hunt | G01S 19/48 |
| | | | 701/472 |
| 2007/0233374 A1* | 10/2007 | Diekhans | A01B 69/008 |
| | | | 701/50 |
| 2014/0216314 A1 | 8/2014 | Bourgault et al. | |
| 2015/0019093 A1* | 1/2015 | Jeong | F16H 61/143 |
| | | | 701/65 |
| 2016/0260328 A1* | 9/2016 | Mishra | G01S 13/931 |
| 2017/0010100 A1* | 1/2017 | Takeuchi | G05D 1/0276 |
| 2017/0227970 A1* | 8/2017 | Taguchi | G01S 19/485 |
| 2017/0257742 A1* | 9/2017 | Mihály | H04W 4/023 |
| 2018/0035144 A1* | 2/2018 | Wu | H04W 4/02 |
| 2018/0243772 A1* | 8/2018 | Davis | A01M 7/0057 |
| 2018/0243773 A1* | 8/2018 | Davis | A01C 23/007 |
| 2018/0364717 A1* | 12/2018 | Douillard | G01S 17/66 |
| 2019/0032305 A1* | 1/2019 | Hageman | E02F 3/847 |
| 2020/0133296 A1* | 4/2020 | Pauls | G05D 1/0274 |
| 2020/0241573 A1* | 7/2020 | Sekiyama | G08G 5/0026 |
| 2020/0300967 A1* | 9/2020 | Demerly | G01S 17/931 |
| 2020/0375084 A1* | 12/2020 | Sakaguchi | B60W 40/064 |
| 2021/0064036 A1* | 3/2021 | Muro | G05D 1/0251 |
| 2021/0157334 A1* | 5/2021 | Zhou | A01D 34/008 |
| 2021/0267117 A1* | 9/2021 | Bogdan | A01B 79/005 |

FOREIGN PATENT DOCUMENTS

| | | |
|---|---|---|
| EP | 1266552 B1 | 10/2013 |
| GB | 2286696 B | 8/1998 |
| WO | 2018214977 A1 | 11/2018 |

\* cited by examiner

AUTONOMOUS AGRICULTURAL WORKING MACHINE AND METHOD OF OPERATION

CROSS-REFERENCE TO RELATED APPLICATIONS

This application claims priority from German Application DE 10 2019 111315.6, filed May 2, 2019, the disclosure of which is hereby incorporated herein in its entirety by reference.

FIELD OF THE INVENTION

The invention relates to an autonomous agricultural work machine and to a method for operating an autonomous agricultural work machine.

BACKGROUND

Partially autonomous and fully autonomous vehicles are being increasingly found in agriculture. An application has been made for such a vehicle, for example, in German patent application No. 10 2018 108 024.

Such autonomous vehicles must meet the requirements of the machine guideline 2006/42/EG, in particular the requirements of standards ISO 12100 and ISO 13849 and ISO 25119. According to these standards, what is referred to as a performance level (PL) must be defined for control functions, and the controllers must be correspondingly configured. That is to say the respective architecture of the control hardware and the control software must be correspondingly implemented in accordance with the defined performance level.

Taking this as a starting point, reliable detection of persons has proven very difficult. Sensor systems such as is known, for example, from the field of automobiles can be used only to a limited degree for this. The reason for this is the various growth stages of plants. For example, maize plants can grow up to 3 metres or more. In addition, agricultural work machines (e.g. field sprayers, manure spreaders, seed drills) can have large working widths of 24 metres, 30 metres or more. A sensor system with which, for example, even a lying person can be "safely" detected in a crop which is 3 metres high or dense, over a working width of up to 36 metres according to the machine guideline has previously not been technically possible, or if it has, has been extremely complicated and expensive.

A further aspect which is difficult to implement in terms of safety technology relates to the implementation of a "virtual boundary" within which the agricultural work machine may move. That is to say it must be ensured that the work machine does not exit the respective agricultural area in an uncontrolled fashion. In this context there is a difference from vehicles which are known, for example, from the field of automobiles. Passenger cars and trucks are respectively guided along roads whose boundaries are marked, for example by reflector posts which can be satisfactorily recognised or sensed by means of a sensor system. This is not the case, or the case only to a limited degree, with large agricultural areas which additionally can have a wide variety of boundaries (e.g. adjoining a road or adjoining a field path or adjoining other crops or the like) and boundary contours (e.g. twisting, straight or the like). A reliable position-determining device can form a basis for safe navigation.

U.S. Pat. No. 5,974,348A discloses an automated work system and work method. One or more self-navigating robots can execute automated working processes with an accuracy of six degrees of freedom in a terrain which is undulating, drops away or is irregular. A self-propelling robot moves through the garden and carries out garden work according to a predefined course by coupling and periodic determination of its position and orientation. At least seven navigation beacons are arranged around a garden working area. Each beacon emits electromagnetic radiation over the garden, in order to be detected by the robot with its self-drive. A navigation module determines the position and orientation of the robot in the garden on the basis of the output of an image camera.

EP 1 266 552 B1 discloses a device for determining the position of an agricultural working vehicle. A first position sensor generates a first position signal which contains information about the current position of the working vehicle and is generated by a satellite signal. A second position sensor generates a second position signal which contains information about the current position of the working vehicle and is generated by a local, second position sensor which is mounted on the working vehicle. An evaluation device is supplied with the first position signal and the second position signal and is configured to calculate the respective position of the working vehicle. The evaluation device is provided with quality information about the quality of the two position signals and the evaluation device takes into account the first position signal and the second position signal, weighted according to the quality information, in the calculation of the position.

The position-determining devices which are known from the prior art can from time to time have deviations from the actual position ranging from several centimetres up to a metre or more. This could result in the working machine being guided along a previously defined course, for example offset by the respective deviation. In addition, it could be the case that the connection between a control unit and a positioning-determining device is interrupted, which could in turn result in states which are critical for safety. This could be critical, in particular, if the work machine has to be moved precisely next to a road.

The invention is based on the object of providing an alternative and/or improved technology for operating an autonomous agricultural work machine.

The object is achieved by means of the features of the independent claims. Advantageous developments are specified in the dependent claims and the description.

The invention provides a method for operating an (for example partially or fully) autonomous agricultural work machine. The method comprises determining (for example sensing) a first current position of the agricultural work machine by means of a first position-determining device. The method comprises determining (for example sensing) a second current position of the agricultural work machine by means of a second position-determining device. The method comprises determining a difference value which relates to a difference (for example distance, interval etc.) between the first current position and the second current position. The method comprises autonomously operating the autonomous agricultural work machine as a function of the determined difference value.

By comparing two current positions which are determined independently of one another it is possible to reduce the occurrence of safety-critical situations which are brought about by faulty position determinations. If both positions which are determined independently of one another are similar to one another, it can be assumed with a high probability that the work machine is actually located in the region of the first and second current positions. In addition, a treatment (of crops or soil) by the work machine can be improved, since the desired treatment can be carried out with a higher level of safety with more accurate positioning.

In one exemplary embodiment, the determination of the first current position and the determination of the second current position are carried out simultaneously or within a predetermined time window. This increases the comparability of the positions. The time window (e.g. shorter than 1 s, 0.1 s or 0.01 s) can be dimensioned to be so small that the time difference between the measurements does not result in any relevant position differences. The use of the time window can increase the applicability in practice, since the determination of the first and second current positions can only be implemented at precisely the same times at high cost. The comparison of the times relating to the determination of the current positions can be made possible, for example, by automatically generated time stamps which are assigned to the current positions.

In a further exemplary embodiment, the determination of the first current position and the determination of the second current position are carried out at different times. The first current position or the second current position are converted to a common time base, preferably taking into account a velocity and/or a direction of travel of the autonomous agricultural work machine. Therefore, an influence on the change in the position of the work machine owing to the difference in time during the determination of the first and second current positions can be compensated or at least reduced. For example, an interpolation with respect to the first or second current positions can be carried out taking into account the velocity and/or the direction of travel of the autonomous agricultural work machine.

In a further exemplary embodiment, the first position-determining device is embodied separately and/or independently with respect to the second position-determining device. For example, the position-determining devices can use different physical measuring principles. Thus, it can be ensured that both position-determining devices are not subject to the same error, which would therefore not become apparent during the comparison.

In a further exemplary embodiment, the first position-determining device and/or the second position-determining device is/are included in the autonomous agricultural work machine.

In one embodiment, the operation of the autonomous agricultural work machine comprises stopping, deactivating, transferring into a safe state, stopping an action, reducing a current velocity and/or reducing a maximum permissible velocity of the autonomous agricultural work machine if the determined difference value exceeds a predefined, preferably variable and/or multi-stage, limiting value. It is therefore possible to react to excessively large differences between the current positions, with the result that, where appropriate, it is possible to prevent dangerous situations which occur owing to faulty position determinations.

In a further embodiment, the operation of the autonomous agricultural work machine comprises continuing with a journey, continuing with an action, operating according to advance planning (for example planned before the operation of the work machine, for example by means of a track planning tool), increasing or maintaining a current velocity and/or increasing or maintaining a maximum permissible velocity of the autonomous agricultural work machine if the determined difference value undershoots a predefined, preferably variable and/or multi-stage, limiting value. The work machine can therefore be operated as desired and planned in an autonomous fashion only when there are small (tolerable) differences between the first and second current positions.

In a further embodiment, the limiting value depends on a current velocity of the autonomous agricultural work machine. The limiting value preferably decreases when the current velocity increases and/or increases when the current velocity decreases. Therefore, in the case of relatively high velocities, at which dangerous situations can occur more quickly, there can be a lower tolerance threshold with respect to the tolerated differences between the determined positions. The risk of dangerous situations can therefore be considerably reduced.

In a further embodiment, the limiting value is position-dependent, preferably dependent on the first current position and/or the second current position. The limiting value preferably decreases if the first current position and/or the second current position is within a predefined spatial, preferably stationary or mobile, hazardous area (for example on a road, path, embankment, body of water, field boundary, boundary of a plot of land, building, wind turbine, solar power plant, power mast, other vehicle, person, animal etc.) or the autonomous agricultural work machine approaches the predefined spatial hazardous area. Alternatively or additionally, the limiting value can increase if the first current position and/or the second current position is outside a predefined spatial, preferably stationary or mobile, hazardous area (e.g. on a road, path, embankment, body of water, field boundary, boundary of a plot of land, building, wind turbine, solar power plant, power mast, other vehicle, person, animal etc.) or the autonomous agricultural work machine moves away from the predefined spatial hazardous area. The risk of dangerous situations in the predefined spatial hazardous areas owing to differences between the first current position and the second current position can therefore be reduced.

In one embodiment variant, the first position-determining device is a satellite-supported position-determining device (or part of a satellite-supported global position-determining system) and the second position-determining device is a local position-determining device (or part of a local position-determining system). Alternatively, the first position-determining device and the second position-determining device can each be a local position-determining device. Alternatively, the first position-determining device and the second position-determining device can each be a satellite-supported position-determining device.

In one development, the local position-determining device has a surroundings-sensing sensor system of the autonomous agricultural work machine. The surroundings-sensing sensor system preferably has a radar device, a laser scanner device, a Lidar device, a camera device and/or an unmanned aircraft.

In one embodiment variant, the local position-determining device is designed to sense or determine a distance and/or an angular position between (for example a predetermined position or axis (for example longitudinal axis or transverse axis)) the autonomous agricultural work machine and at least one (for example 1, 2 or more) predefined landmark arranged at a predetermined position, preferably in order to determine a current position of the autonomous agricultural work machine.

In a further embodiment variant, the at least one landmark is at least partially manmade, preferably having a post, a building, a wind turbine, a power mast, another vehicle, a road, a solar power plant and/or a field boundary. Alternatively, or additionally, the at least one landmark can be at least partially natural, preferably having a rock formation, a plant formation, a form of terrain and/or a body of water.

In one exemplary embodiment, the at least one landmark is stationary or mobile.

For example, at least two landmarks, for example posts, can be arranged on a movable vehicle, for example a trailer.

In a further exemplary embodiment, the at least one landmark is provided with a marking, preferably for an image-processing algorithm of a camera device, and/or with a reflector or a signal source, preferably for sensing for a surroundings-sensing sensor system. Therefore, the recognizability and/or identifiability of the landmarks can be improved by the surroundings-sensing sensor system.

In one exemplary embodiment, the surroundings-sensing sensor system has a radar device by means of which a distance and/or an angular position between the autonomous agricultural work machine and at least one landmark, preferably a post, is sensed, and the first or second current position is determined therefrom. The radar device can preferably have a multi-directional radar sensor. Alternatively, or additionally, the radar device can have, for example, in each case a radar sensor on both longitudinal outer sides of the autonomous agricultural work machine. A radar device can preferably be used, since it is resistant to the weather and correspondingly has a large range, as a result of which a small number of landmarks may be sufficient even for large areas of farm land.

In one exemplary embodiment, the local position-determining device has an odometry device (for example having a wheel rotation sensor or sensors) for sensing a distance traveled by the work machine and/or an inertial-measuring device (for example having a gyroscope or gyroscopes and/or an acceleration sensor or sensors and/or a speed sensor or sensors) for sensing a speed, an acceleration, rolling, pitching and/or yawing of the work machine. This local position-determining device can be used, for example, to sense the first current position or the second current position, for example on the basis of a position which has been previously determined by means of another position-determining device.

It is also possible for the odometry device and/or the inertial-measuring device to be used to determine a (long-term or persistent) direction of travel. If the work machine is then, for example, briefly without a position signal from another local position-determining device (in so far as one is present) and/or a satellite-supported position device (in so far as one is present), the work machine can be operated further along the previous direction of travel if desired.

In one embodiment, the autonomous agricultural work machine is designed to travel autonomously in a predefined spatial working area along a predefined movement path, preferably having a multiplicity of parallel lanes or tracks, preferably with predefinition of a maximum permissible velocity and/or preferably with execution of a soil and/or crop treatment process which is assigned to the autonomous agricultural work machine, at predefined positions along the movement path. The working area and movement path can be produced in a computer-supported fashion, for example by means of a track-planning tool before the operation of the work machine, and can be stored in a control unit of the work machine.

The invention also relates to an autonomous agricultural work machine which has a first position-determining device and a second position-determining device. The work machine also has a control unit which is configured to carry out a method as disclosed herein. The work machine permits the same advantages to be achieved as those which have already been described for the method.

The term "control unit" can preferably relate to electronics (for example with a microprocessor or microprocessors and data memories) control, which electronics control can perform open-loop and/or closed-loop control tasks depending on the design. Even if the term "control" is used here, it is therefore also possible, as it were, for it to expediently also cover the terms "closed-loop control" or "control with feedback".

According to a further aspect, the control unit can determine a long-term orientation of the work machine on the area of farm land on the basis of continuous sensing of the position of the work machine by means of the two position-determining devices, wherein there can preferably be provision that by means of the control unit a comparison is carried out between the determined long-term orientation of the work machine and the movement path which is predefined by means of a track-planning tool, in order to determine whether the travel paths are correspondingly precisely followed or not.

BRIEF DESCRIPTION OF THE DRAWINGS

The preferred embodiments and features of the invention which are described above can be combined with one another as desired. Further details and advantages of the invention are described below with reference to the appended drawings, in which.

DETAILED DESCRIPTION

The embodiments shown in the figures correspond at least partially, with the result that similar or identical parts are provided with the same reference symbols, and for the explanation thereof reference is also made to the description of the other embodiments or figures, in order to avoid repetitions.

Figure 1:
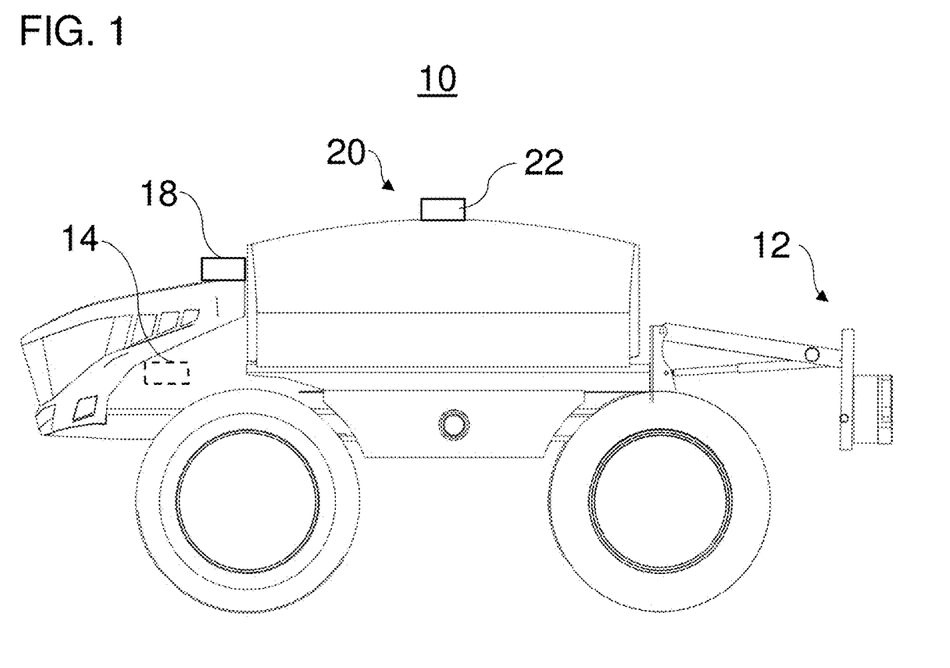
FIG. 1 shows a schematic side view of an autonomous agricultural work machine.

FIG. 1 shows an autonomous agricultural work machine 10 in the form of a self-propelled autonomous field sprayer. The field sprayer can distribute fluid media, for example fertilizer, crop protection agents or the like, by means of a treatment device (implement) 12 in the form of a distributor boom (spray boom) on a piece of agricultural land.

It is possible that the work machine 10 is not embodied in a self-propelling fashion but rather is moved, preferably towed, for example, by a powered vehicle, for example a tractor. It is also possible for the work machine 10 to have an alternative or additional treatment device 12 for treating the soil and/or crops.

For example, the work machine 10 can alternatively be embodied as a manure spreader or seed drill. According to one alternative embodiment variant, the work machine 10 can also be a machine for cultivating the soil and/or for sowing seed and comprise, for example, a treatment device 12 for cultivating the soil and/or for sowing agricultural seed, distributing manure or the like. The work machine 10 can also be an autonomous carrier vehicle on which in turn soil cultivation implements, sowing coulters or spray booms or the like can be installed. The work machine 10 can also be or have a tractor vehicle (for example a tractor) which is suitable for agriculture. In turn, a machine for cultivating the soil and/or for sowing seed or for distributing plant protection agents can be attached to the tractor vehicle or can be towed over a piece of farm land by means of said vehicle. The work machine 10 could also be a harvesting machine such as, for example, a field chopper or a combine harvester or the like. Generally, the work machine 10 can therefore be any work machine which is suitable for agricultural use.

The work machine 10 can also be controlled manually, for example by means of remote control and/or by means of an operator control panel which is present on the work machine 10. Manually input commands can be processed with priority before autonomously generated commands. An example of such a manual command can be, for example, an emergency off switch.

The work machine 10 has a control unit 14. The control unit 14 can automatically move the work machine 10 along predefined movement path, preferably having a multiplicity of parallel lanes or tracks, in a predefined spatial working area.

Figure 2:
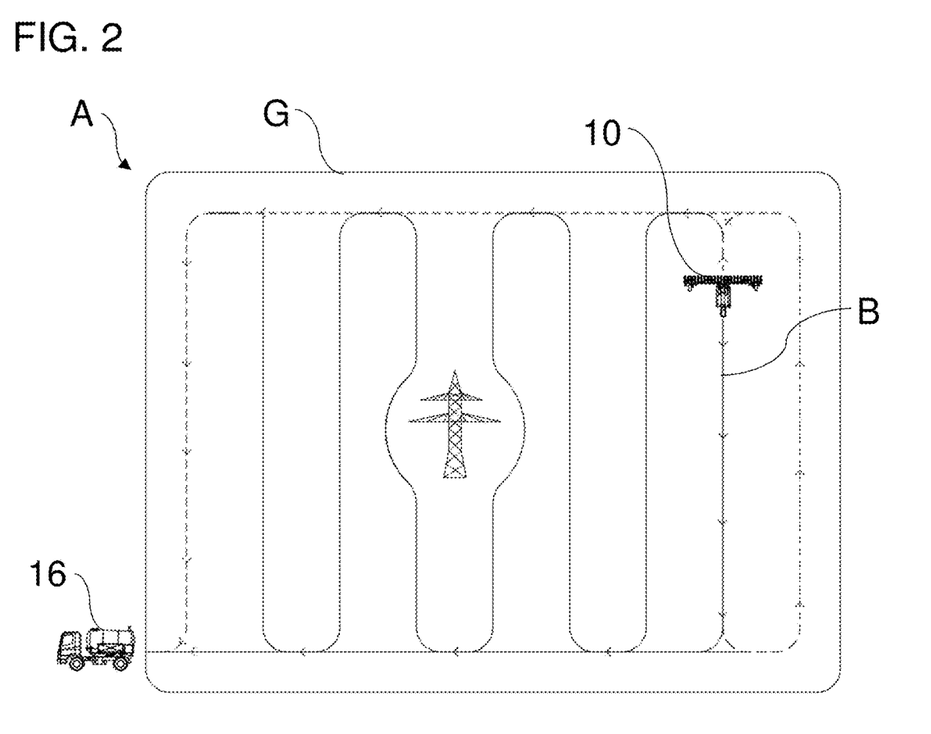
FIG. 2 shows a schematic plan view of a piece of agricultural land on which an autonomous agricultural work machine is operated.
Figure 3:
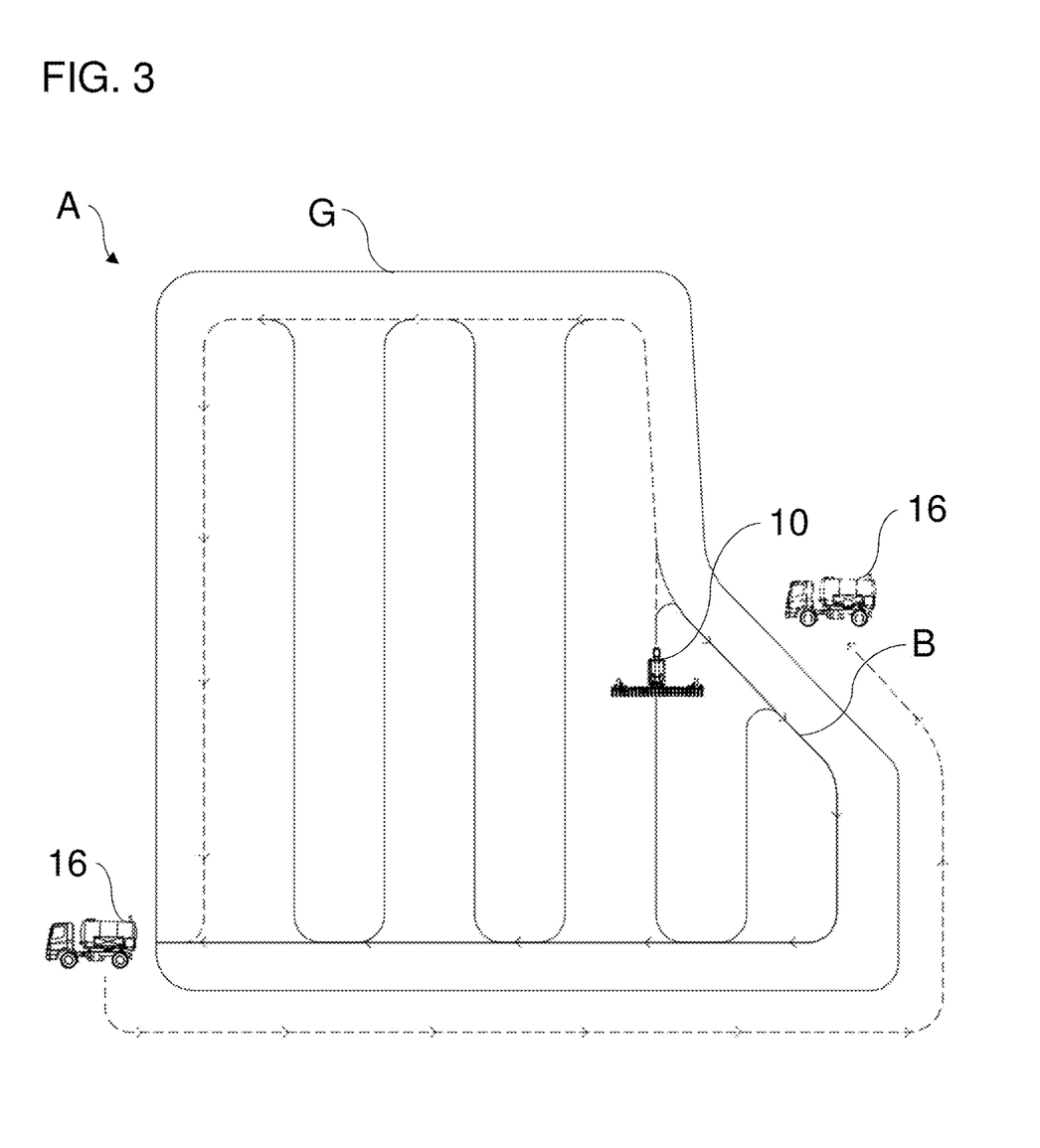
FIG. 3 shows a schematic plan view of a further piece of agricultural land on which an autonomous agricultural work machine is operated.

For the sake of clarity, FIGS. 2 and 3 show exemplary movement paths B in a predefined spatial working area A. The working area A is a piece of agricultural land or piece of farm land such as, for example, a piece of land for the cultivation of cereal. The working area A is delimited toward the outside by a (field) boundary G.

The movement path B is predefined before the start of the work, for example by means of a track-planning tool. During operation, the work machine 10 then moves along the predefined movement path B. The movement path B can be planned in such a way that the respective optimum tracks for the work machine 10 are predefined, for example in order to expediently predefine the sequence in which the working area A is to be traveled through. By means of such track planning it is possible, for example, to take into account obstacles accordingly in the planning of the movement path B. The movement path B can also be predefined in such a way that crossing through partial sections of the working area A twice can be at least largely prevented. Such track-planning tools can be based, for example, on a technology which is known as "Controlled Traffic Farming (CTF)".

In addition to the movement path B, it is also possible to predefine, for example, the velocity at which the work vehicle 10 may or should move autonomously at a particular point of the working area A. It is also possible, for example, to predefine where (a position) and/or how (for example with what intensity) the respective treatment device 12 is to be operated along the movement path B (for example distribution of material to be distributed, harvesting of material to be harvested or the like).

It is possible that, in order to supply the work machine 10 with energy (for example electrical energy or fuel) and/or in order to supply the treatment device 12, a supply vehicle 16 is provided. The supply vehicle 16 can make available, for example, the material which is to be respectively distributed in a liquid and/or solid (in particular granular form). The work machine 10 can, if desired, be moved autonomously to the supply vehicle 16 (see FIG. 2). The work machine 10 can travel along the path to the supply vehicle 16 at the same velocity or at a different velocity as for the work in the working area A. For the travel to the supply vehicle 16, the treatment device can be moved, for example folded, into a transportation position. Alternatively or additionally, the supply vehicle 16 can be moved (fully or partially) autonomously to the work machine 10. For example, a supply position at which the work machine 10 is to be met for the supply process can be displayed to a driver of the supply vehicle 16.

It is possible that, for example, a position at which the working process of the work machine 10 is interrupted is stored by means of the control unit 14 during operation. After the supply process by means of the supply vehicle 16, this position can be traveled to again by the work machine 10 and its route can be continued along the movement path B. The routes which are traveled along for this do not have to be identical.

It is also possible that the work machine 10 has a system for monitoring residual quantities. That is to say the work machine 10 can be provided with, for example, filling-level-monitoring sensors (for example a weighing system, flow rate measuring system or the like) by means of which it can be respectively determined, for example, how much material to be distributed is still present in the work machine 10. The control unit 14 can then determine how long the material to be distributed will still be available, i.e. what distance can still be traveled. On the basis of this evaluation, the work machine 10 can be subsequently controlled, for example, in such a way that a route or a section of a route for which the dispersal quantity is still sufficient is worked, or the work machine 10 is moved directly to the supply vehicle 16 without a further section of a route being started.

The described method for supplying the work machine 10 by means of the supply vehicle 16 can equally also be used analogously for servicing operations. For example, when a servicing measure is to be carried out on the work machine 10, the optimum movement path to a stationary or mobile "servicing point" can be determined, for example by the control unit 14. The same also applies to faults on the work machine 10. In the case of faults, an evaluation can again be carried out by means of the control unit 14 to determine whether the work machine 10 can at all still be moved to the "servicing point" or not.

Reference is made again to FIG. 1. For the purpose of navigation along the predefined movement path B, the work machine 10 has a first position-determining device 18 and a second position-determining device 20. The position-determining devices 18 and 20 are designed to determine a current position of the work machine 10 independently of one another.

The position-determining devices 18, 20 can both be embodied as satellite-supported (global) position-determining devices or both as local position-determining devices. The first position-determining device 18 is preferably a satellite-supported position-determining device and the second position-determining device 20 is preferably a local position-determining device.

The satellite-supported position-determining device can be, for example, a GPS position-determining device, a Galileo position-determining device, a Glonass position-determining device or a Beidou position-determining device.

The local position-determining device can have a surroundings-sensing sensor system 22. The surroundings-sensing sensor system 22 can have a radar device, a laser scanner device, a Lidar device and/or a camera device. For example, a multi-directional radar device can be provided (for example on an upper side of the work machine 10), or a plurality of radar sensors can be provided on different sides of the work machine 10. The surroundings-sensing sensor system 22 can expediently have a plurality of sensor devices which are based on different physical measuring principles. It is also possible to apply image-recognition algorithms to recordings of the surroundings-sensing sensor system 22 in order, for example, to identify known structures (for example landmarks) in the recordings.

It is possible for the surroundings-sensing sensor system 22 to have an unmanned aircraft (a drone) for monitoring the surroundings of the work machine 10 for landmarks and/or ambient conditions. The unmanned aircraft can have a communication connection to the control unit 14 and carry, for example, a radar device, Lidar device and/or camera device.

The surroundings-sensing sensor system 22 can expediently be used to sense predetermined landmarks 24 in the surroundings of the work machine 10. The landmarks 24 can each have a predetermined known position. The landmarks 24 are each positioned in such a way that their precise position is known with respect to the working area A. In particular, the positions can be measured once with satellite support. The position can be sensed manually. However, it is also conceivable for the landmarks 24 to measure their precise position automatically.

A current position of the work machine 10 can be determined from the known positions of the sensed landmarks 24. For example, distances from the landmarks 24 and/or angular positions with respect to the landmarks 24 can be determined.

Figure 4:
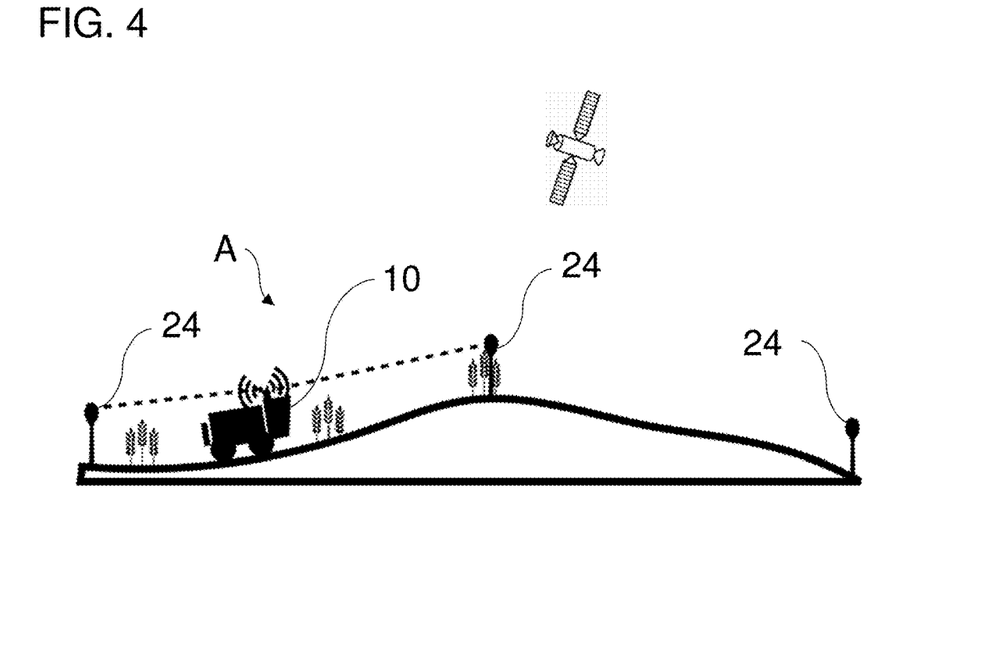
FIG. 4 shows a schematic illustration of operation of an autonomous agricultural work machine.
Figure 5:
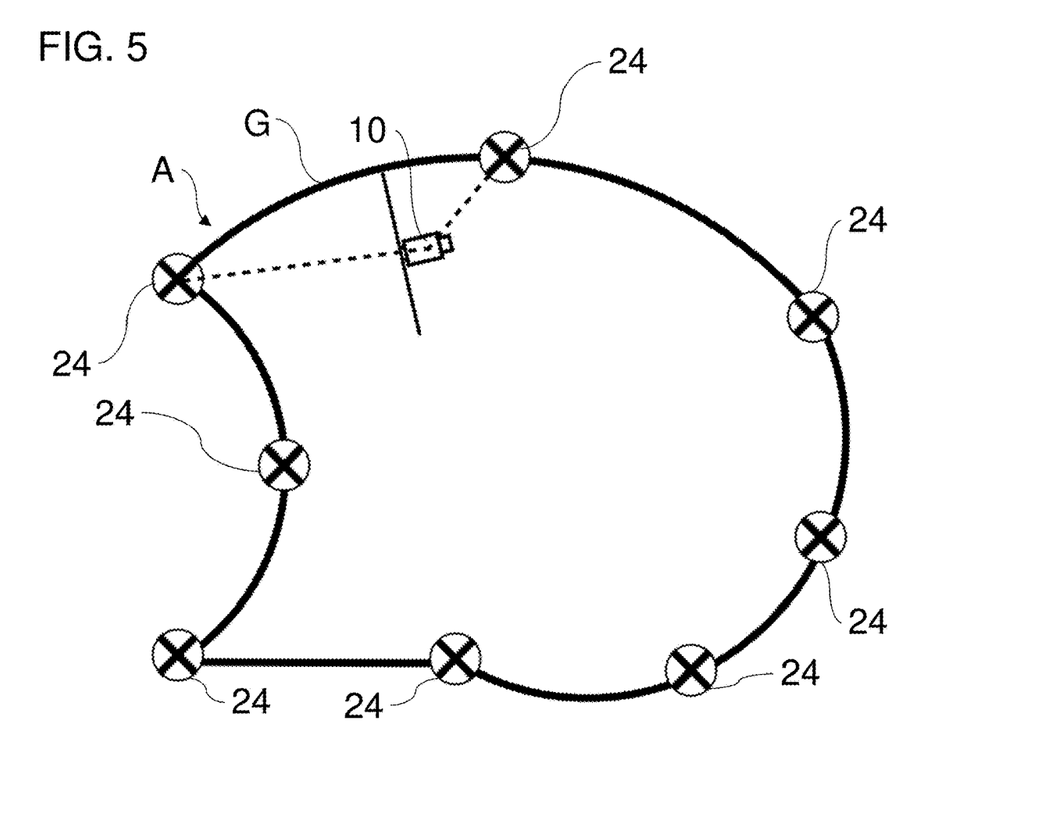
FIG. 5 shows a schematic plan view of operation of an autonomous agricultural work machine according to FIG. 4.

FIGS. 4 and 5 show by way of example how stationary posts or pillars can be used as landmarks 24. The posts can be arranged, for example, on outer boundaries of the working area A. The posts or landmarks 24 can, however, also be arranged at least partially within or outside the working area A. The height, size and number of the posts or landmarks 24 can be adapted to the working area A (size, shape, unevenness, plant stock etc.).

Figure 6:
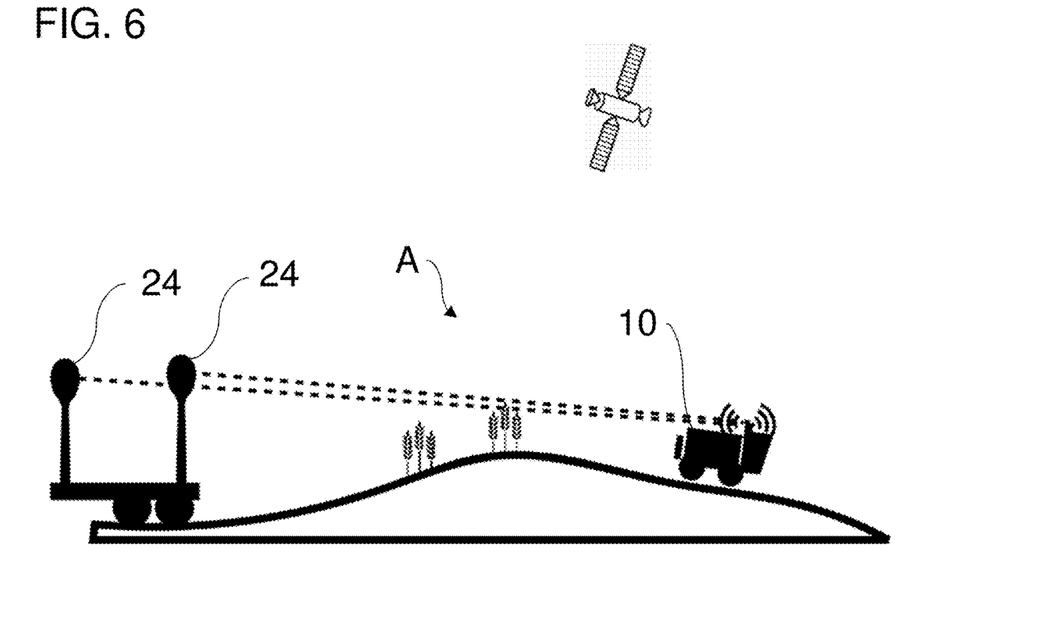
FIG. 6 shows a schematic illustration of operation of an autonomous agricultural work machine.
Figure 7:
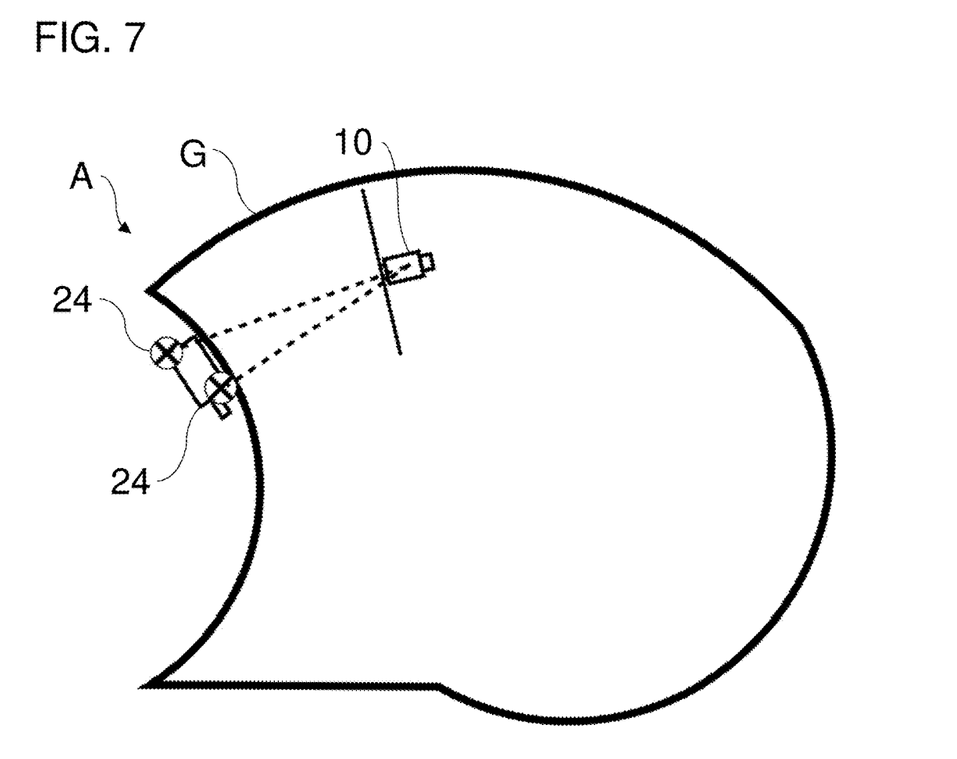
FIG. 7 shows a schematic plan view of operation of an autonomous agricultural work machine according to FIG. 6.

FIGS. 6 and 7 show by way of example how mobile posts can be used as landmarks 24. The posts can be positioned, for example, on a mobile vehicle (for example a trailer). The current position of the posts or landmarks 24 is determined initially, for example, after the parking of the mobile vehicle, and is stored in the control unit 14 of the work machine 10.

The landmarks 24 can be provided with a special marking so that, for example when an image-recognition algorithm is used the landmarks 24 can be unambiguously identified. The landmarks 24 can also have a reflector or a signal source (for example light source) which facilitates or actually permits sensing by means of the surroundings-sensing sensor system 22.

The landmarks 24 can be at least partially manmade, like the described posts. It is also possible to use a building, a wind turbine, a power mast, another vehicle, a road, a solar power plant or a field boundary or the like as a landmark 24 with a known predetermined position. In addition to manmade landmarks 24, it is also possible to use natural landmarks. For example, rock formations, plant formations, forms of terrain, bodies of water or the like can be used as landmarks 24 with a known predetermined position.

It is also possible that, for example, a further or alternative local position-determining device for sensing a current position of the work machine 10 is included. The work machine 10 can have an odometry device and/or an inertial-measuring device as a local position-determining device. The odometry device can sense a distance traveled along by the work machine 10, for example by means of wheel revolution sensors. The inertial-measuring device can sense a speed, an acceleration, rolling, pitching and/or yawing of the work machine 10, for example by means of corresponding gyroscopes, speed sensors and acceleration sensors. The data of the odometry device and/or an inertial-measuring device can be used to track a path of the work machine 10 starting from a known position, and therefore to sense a current position of the work machine.

The work machine 10 can expediently be operated in at least two operating modes: a manual operating mode and an autonomous operating mode. In the manual operating mode, an operator control action which brings about movements and operations of the work machine 10 is carried out on the basis of manual operator control specifications by an operator, for example by means of remote control. In the autonomous operating mode, the work machine 10 is controlled (partially or fully) autonomously by the control unit 14, in particular on the basis of setpoint specifications which are predefined by means of the track-planning tool. Activation of the autonomous operating mode can be linked to specific conditions: for example no obstacles in the surroundings of the work machine 10, field of vision of the surroundings-sensing sensor system 22 sensed as sufficient for a desired velocity and/or a current position of the work machine 10 sensed as sufficiently precise.

Figure 8:
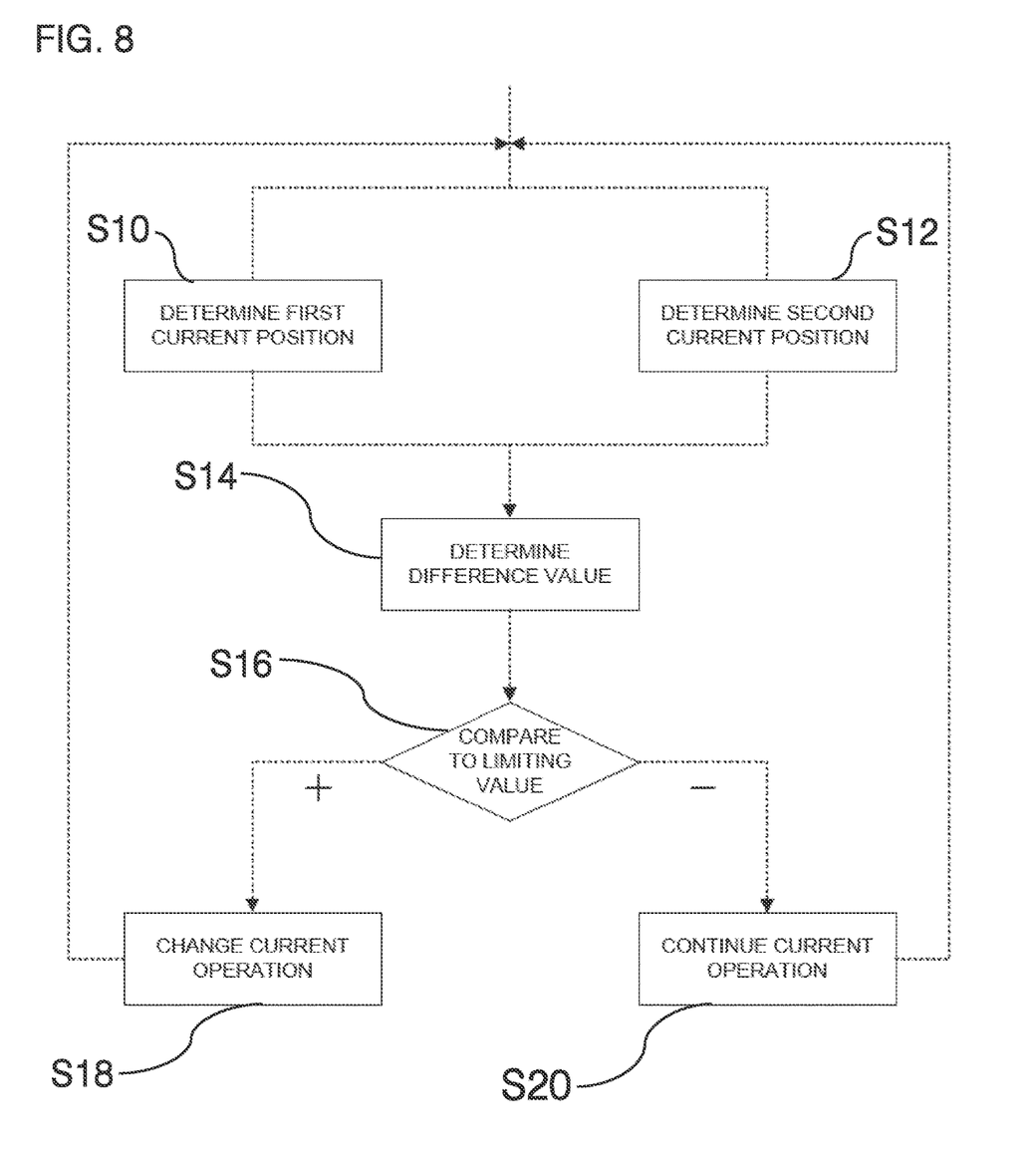
FIG. 8 shows an exemplary movement sequence relating to the operation of an agricultural work machine according to the present disclosure.

FIG. 8 shows an exemplary movement sequence for the autonomous operation of the work machine 10. The method can be carried out, for example, by the control unit 14. The control unit 14 can receive data from the first and second position-determining devices 18 and 20 for this.

In a step S10, a first current position of the work machine 10 can be determined by means of the first position-determining device 18.

In a step S12, a second current position of the work machine 10 can be determined by means of the second position-determining device 20. The second current position is determined independently of the first current position.

The first and second current positions are preferably determined simultaneously. However, it is also possible for the first and second current positions to be determined at different times. By means of the knowledge of a velocity and a direction of travel of the work machine 10 it is possible to convert the first and second current positions to a common (simultaneous) time base, for example by interpolation.

It is possible for the first current position and the second current position to refer to different coordinate systems, for example to a global coordinate system and to a local machine-based coordinate system of the work machine 10. In order to permit comparability of the positions, corresponding coordinate transformations can therefore be carried out with respect to the first current position or the second current position.

In one step S14, a difference value between the first current position and the second current position can be determined. The difference value can have a distance of the positions in the x, y and/or z directions. The difference value can have a difference in orientation and/or a difference in angle about the x, y and/or z axes. The difference value specifies to what extent the first current position differs from the second current position. The work machine 10 can be operated autonomously by the control unit 14 in accordance with a magnitude of the difference value.

For example, in one step S16 the difference value can be compared with a predefined limiting value, in order to decide how the work machine 10 is to be operated further in an autonomous fashion. If the difference value exceeds the limiting value (+), the method can be continued with a step S18. If the difference value undershoots the limiting value (-), the method can be continued with a step S20.

In the step S18, that is to say when there is an excessively large difference between the first and second current positions, different changes can be performed in the autonomous operation of the work machine 10. For example, the work machine 10 can autonomously stop, be deactivated or be transferred into a safe state, for example by additionally stopping a treatment by the treatment device 12. It is also possible that, for example, a current velocity, or a maximum permissible velocity, of the work machine 10 is reduced. The method can subsequently be ended. Alternatively, the method can start again with the steps S10 and S12, if, for example, autonomous re-starting of the work machine 10 is also desired.

In the step S20, that is to say when there is a small, or even no, difference between the first and second current positions, current operation of the work machine 10 can, in particular, be continued. It is possible that the work machine 10 continues its journey and/or treatment, as originally planned with the track-planning tool. It is also possible that a velocity of the work machine 10 which is a current one or the maximum permissible one, is maintained or even increased. The method can subsequently be started again with the steps S10 and S12.

In order to navigate the work machine 10 along the movement path B, for example a weighted mean value can be determined from the determined first and second current positions. The weightings can be static or dynamic (for example dependent on quality information relating to the respective position signals).

The limiting value can be in multiple stages. For example, at least to a certain extent a plurality of corresponding stages of the limiting value can be provided for multiple possible autonomous actions of the work machine 10. Therefore, for example a relatively high limiting value stage can be provided, above which the work machine 10 is autonomously deactivated. A limiting value stage which is lower in comparison therewith can be provided, above which (only) an autonomous reduction in the velocity of the work machine 10 takes place as long as the abovementioned relatively high limiting value stage is not exceeded.

The limiting value can be variable. For example, the limiting value can depend on a current velocity of the work machine 10. When a velocity increases and there is a correspondingly increased accident risk, the limiting value can decrease. When the velocity decreases and there is a correspondingly reduced accident risk, the limiting value can, in contrast, increase. Alternatively or additionally, the limiting value can also be position-dependent. Therefore, the limiting value can, for example, decrease if the (for example first and/or second) current position indicates positioning of the work machine 10 in a predefined spatial hazardous area within or outside the working area A. For example, the work machine 10 could travel near a road, an embankment, a building or a person. On the other hand, the limiting value can increase if the current position is outside the predefined spatial hazardous area, or the work machine 10 moves away from the predefined spatial hazardous area.

The invention is not limited to the preferred exemplary embodiments described above. Rather, there can be a multiplicity of variants and refinements which also make use of the inventive concept and therefore come within the scope of protection. In particular, the invention also claims protection for the subject matter and the features of the dependent claims independently of the claims referred to. In particular, the individual features of the independent claim 1 are respectively disclosed independently of one another. In addition, the features of the dependent claims are also disclosed independently of all the features of independent claim 1.

LIST OF REFERENCE SYMBOLS

10 Autonomous agricultural work machine
12 Treatment device
14 Control unit
16 Supply vehicle
18 First position-determining device
20 Second position-determining device
22 Surroundings-sensing sensor system
24 Landmark
A Working area
B Movement path
G Boundary
S10-S20 Method steps

What is claimed is:
1. A method for operating an autonomous agricultural work machine, comprising:
  determining a first current position of the agricultural work machine using a first position-determining device;
  determining a second current position of the agricultural work machine using a second position-determining device, wherein the second position-determining device is a surroundings-sensing system comprising at least one of:
    a secondary moving vehicle, configured to detect landmarks and/or ambient conditions in the surroundings of the work machine; or
    a work machine mounted sensor system, configured to detect landmarks of the surrounding environment including at least two configurable landmarks arranged on one or more other movable vehicle systems;
  simultaneously determining the difference between the first current position and the second current position;
  determining a limiting value threshold for the difference between the first and second current position, wherein an operational state of the work machine is selected depending on the difference being greater than or less than the limiting value; and
  autonomously operating the autonomous agricultural work machine according to the operational state of the work machine.

2. The method of claim 1, wherein the secondary moving vehicle is a deployable autonomous vehicle, such as a drone aircraft.

3. The method of claim 1, wherein the two configurable landmarks arranged on one or more other movable vehicles are posts with a marking for an image-processing algorithm of a camera device and/or with a reflector or a signal source for sensing for a surroundings-sensing sensor system.

4. The method according to claim 1, wherein the first current position and the second current position are determined at different times, and the first current position or the second current position are converted to a common time base.

5. The method of claim 4, wherein converting the first current position or the second current position to the common time base is dependent on at least one of a velocity or a direction of travel of the autonomous agricultural work machine.

6. The method of claim 1, wherein autonomously operating the autonomous agricultural work machine according to the operational state of the work machine, comprises at least one of stopping, deactivating, transferring into a safe state, stopping an action, reducing a current velocity, or reducing a maximum permissible velocity of the autonomous agricultural work machine when the determined difference exceeds the limiting threshold value.

7. The method of claim 6, wherein the limiting threshold value is weighted to increase or decrease from a predetermined value, on the basis of either:
a measured distance between the agricultural work machine and one or more detected landmarks in an operating environment; or
a measured current velocity of the agricultural work machine.

8. The method of claim 1, wherein the surroundings-sensing system determines a distance and/or an angular position between the autonomous agricultural work machine and at least one predefined landmark arranged at a predetermined position in order to determine the second current position of the autonomous agricultural work machine.

9. The method of claim 8, wherein the at least one predefined landmark comprises:
a manmade landmark, comprising a post, a building, a wind turbine, a power mast another vehicle, a road, a solar power plant, or a field boundary; or
a natural landmark, comprising a rock formation, a plant formation, a form of terrain, or a body of water.

10. The method of claim 8, wherein the surroundings-sensing sensor system comprises a radar device measuring at least one of:
a distance between the autonomous agricultural work machine and at least one landmark; and
an angular position between the autonomous agricultural work machine and at least one landmark.

11. The method of claim 10, wherein the radar device comprises at least one of:
a multi-directional radar sensor; or
a radar sensor on both longitudinal outer sides of the autonomous agricultural work machine.

12. The method according to claim 1, wherein:
at least one of the first position-determining device and the second position-determining device comprises at least one of an odometry device for sensing a distance travelled by the work machine or an inertial-measuring device for sensing at least one of a speed, an acceleration, rolling, pitching or yawing of the work machine.

13. The method according to claim 1, wherein the first current position and the second current position are determined within a predetermined time window.

14. The method of claim 1, wherein the agricultural work machine is designed to travel autonomously in a predefined spatial working area along a predefined movement path, comprising a multiplicity of parallel lanes or tracks with predefinition of a maximum permissible velocity and/or with execution of a soil and/or crop treatment process which is assigned to the autonomous agricultural work machine, at predefined positions along the predefined movement path.

15. The method of claim 1, wherein autonomously operating the autonomous agricultural work machine comprises at least one of: continuing with a journey, continuing with an action, operating according to advanced planning, increasing or maintaining the current velocity or increasing or maintaining a maximum permissible velocity of the autonomous agricultural work machine when the determined difference undershoots the predefined limiting value.

16. An autonomous agricultural work machine, comprising a controller which is configured to carry out the method of claim 1.

17. A system for autonomously operating an agricultural work machine, comprising:
an autonomous or semi-autonomous agricultural work machine;
a first position-determining device configured to determine a first current position;
a second position-determining device configured to determine a second current position, wherein the second position-determining device is a surroundings-sensing sensor system comprising at least one of:
a secondary moving vehicle, configured to detect landmarks and/or ambient conditions in the surroundings of the autonomous agricultural work machine; or
a work machine mounted sensor system mounted to the autonomous agricultural work machine, configured to detect landmarks of the surrounding environment including at least two configurable landmarks arranged on one or more other movable vehicle systems;
a controller, the controller configured to:
simultaneously determine the difference between the first current position and the second current position;
determine a limiting value threshold for the difference between the first and second current position, wherein an operational state of the work machine is selected depending on the difference being greater than or less than the limiting value; and
autonomously operate the autonomous agricultural work machine according to the first and second determined positions and the operational state of the work machine.

18. The system of claim 17, wherein the secondary moving vehicle is a deployable autonomous vehicle, such as a drone aircraft, and wherein the two configurable landmarks arranged on one or more other movable vehicles are posts with a marking for an image-processing algorithm of a camera device and/or with a reflector or a signal source for sensing for a surroundings-sensing sensor system.

19. The system of claim 17, wherein the first current position and the second current position are determined at different times, and the first current position or the second current position are converted to a common time base.

20. The system of claim 17, wherein:
autonomously operating the autonomous agricultural work machine according to the operational state of the work machine, comprises at least one of stopping, deactivating, transferring into a safe state, stopping an action, reducing a current velocity, or reducing a maximum permissible velocity of the autonomous agricultural work machine when the determined difference exceeds the limiting threshold value; and wherein the limiting threshold value is weighted to increase or decrease from a predetermined value, on the basis of either:
- a measured distance between the agricultural work machine and one or more detected landmarks in an operating environment; or
- a measured current velocity of the agricultural work machine.

21. The system if claim 17, further comprising:
- a supply detection system, configured to detect at least one of:
  - an energy-level or fuel-level of the agricultural work machine; or
  - a working-material-quantity indicating the agricultural work machine's stored quantity of a material used in working operations; and
- a supply vehicle which is at least semi-autonomous, wherein the supply vehicle navigates to a meeting point with the agricultural work machine during operation, the supply vehicle supplying either power, fuel, or a working-material to the agricultural work machine depending on a need determined from the supply detection system.

* * * * *